United States Patent

Speeney

[11] Patent Number: 6,074,745
[45] Date of Patent: Jun. 13, 2000

[54] METHOD OF MAKING ADHESIVE TAPE WITH TEXTURIZED ADHESIVE COATING AND ADHESIVE TAPE SO MADE

[76] Inventor: Michael J. Speeney, 855 Tower View Cir., #2, New Hope, Pa. 18938-9400

[21] Appl. No.: 08/802,808

[22] Filed: Feb. 14, 1997

Related U.S. Application Data

[60] Provisional application No. 60/011,729, Feb. 15, 1996.

[51] Int. Cl.⁷ .................................................. B32B 7/12
[52] U.S. Cl. .................. 428/343; 428/336; 428/355 AC; 427/208.4
[58] Field of Search .................................... 428/343, 336, 428/195, 355 AC; 427/208.4

[56] References Cited

U.S. PATENT DOCUMENTS

| | | |
|---|---|---|
| 890,570 | 6/1908 | McLaurin . |
| 1,148,783 | 8/1915 | Knappstein . |
| 2,054,448 | 9/1936 | Russell . |
| 2,510,120 | 6/1950 | Leander ............................. 428/343 X |
| 2,684,316 | 7/1954 | Warshaw . |
| 2,819,180 | 1/1958 | Koenig . |
| 2,940,868 | 6/1960 | Patchell ............................. 428/343 X |
| 3,542,634 | 11/1970 | Such et al. ......................... 428/343 X |
| 4,647,485 | 3/1987 | Nelson . |
| 5,366,775 | 11/1994 | Kao . |

OTHER PUBLICATIONS

D.M. MacLeod, "An Introduction to Wire–Wound Rod Coating," *Industry Tech*, Florida, pp. 103–111 (undated).
"Why Choose Carton Sealing Tapes Made with Acrylic Adhesives?", Brochure RRA–1, Rohm and Haas Co., Philadelphia, PA, pp. 1–7 (undated).

Primary Examiner—Daniel Zirker
Attorney, Agent, or Firm—Akin, Gump, Strauss, Hauer & Feld, L.L.P.

[57] ABSTRACT

A method of making sealing tape by (i) applying a thin coating of liquid adhesive onto one side of a moving thin film continuous web; (ii) contacting the liquid adhesive coating applied to the web with the surface of a rotating roller, the speed of the roller at the area of contact with the moving adhesive coating being different from the speed of the moving web, to effect roughening of the surface of the applied adhesive coating into a surface texture having a random pattern; and (iii) drying or curing the textured adhesive coating on the web to produce a dry coating of adhesive with a roughened surface texture having peaks and valleys. An economy sealing tape is also disclosed, being a plastic thin film substrate with a thin dry coating of a pressure-sensitive adhesive, the surface of the adhesive coating having a nonembossed, roughened surface texture with peaks and valleys and having a coating thickness of less than about 1 mil (0.025 mm) and, further, the tape having at least one adhesive-free zone running in a longitudinal direction wherein the adhesive-free surface area constitutes at least about 10% to about 80% of the total adhesive coated side.

7 Claims, 1 Drawing Sheet

METHOD OF MAKING ADHESIVE TAPE WITH TEXTURIZED ADHESIVE COATING AND ADHESIVE TAPE SO MADE

CROSS-REFERENCE TO RELATED APPLICATION

This patent application claims the benefit of provisional U.S. Patent Application 60/011,729, filed Feb. 15, 1996.

BACKGROUND OF THE INVENTION

This invention relates to continuous tape having an adhesive on one surface, useful for sealing boxes or the like.

Conventional adhesive tape is generally manufactured by applying a coating of a pressure sensitive adhesive material onto a continuous web or substrate. Adhesive tapes suitable for sealing boxes are often made with polypropylene as the web or substrate and a thin, smooth, continuous coating of an adhesive such as an acrylic polymer resin. Such pressure-sensitive acrylic resin adhesive tapes are preferred for box sealing applications since they exhibit good adhesive performance over a wide range of temperatures.

An improved sealing tape is disclosed in U.S. Pat. No. 5,366,775 of Kao which discloses an easy peel tape of an adhesive on a thin film plastic, e.g., polypropylene, with a release coating and center strip that is adhesive free to facilitate tape removal from the tape roll. U.S. Pat. No. 2,819,180 of Koenig discloses a specialty self-adhesive tape intended for reinforcing holes in paper made by tab punchers; the tape uses an India rubber adhesive on polyvinylchloride film. The tape has several features that minimize processing problems in tab punching equipment, including narrow point indentations for preventing continuous surface contact of adjacent layers in the wound roll and also a non-adhesive middle zone and narrow non-adhesive edge zones where the tape is guided by the tab punching equipment.

Sealing tape used for commercial applications such as box sealing is generally used in large quantities, so economical sealing tape grades are highly desired. Since the adhesive component of the tape constitutes a significant portion of the total cost of the materials employed in manufacturing adhesive tape, there is incentive to minimize the amount of adhesive coating employed, provided that the desired adhesive properties are not compromised. One approach used to this end is reducing the thickness of the adhesive coating. It has been found that adhesive tapes using pressure-sensitive adhesives such as acrylic resins require a minimum of about 0.7 mil (1 mil equals 0.001 inch or 0.025 mm) thickness of coating in order to provide acceptable adhesive sealing properties. Below about 0.7 mil (about 0.018 mm) thickness, the adhesive coating no longer provides the degree of tackiness required for satisfactory box sealing performance.

The present invention addresses the need for an improved economy grade of adhesive tape that provides good box sealing performance.

BRIEF SUMMARY OF THE INVENTION

The present invention is directed to a method of making sealing tape by (i) applying a thin coating of liquid adhesive onto one side of a moving thin film continuous web; (ii) contacting the liquid adhesive coating applied to the web with the surface of a rotating cylindrical roller whose axis is oriented substantially perpendicular to the direction of travel of the moving web, the rotational speed of the roller being such to provide a linear rate of travel of the roller surface at the area of contact with the moving adhesive coating that is different from the linear rate of travel of the moving web, to effect roughening of the surface of the applied adhesive coating into a surface texture having a random pattern; and (iii) processing the textured adhesive coating on the web by a step selected from the group consisting of drying and curing to produce a dry coating of adhesive with a roughened surface texture having peaks and valleys.

Another aspect of the invention is an economy sealing tape comprising a continuous length of a smooth surfaced plastic thin film substrate having one side on which is carried a thin dry coating of a pressure-sensitive adhesive, the adhesive coating having on its outer surface a nonembossed, roughened surface texture with peaks and valleys and having a coating thickness, measured vertically from the surface of the film substrate carrying the coating to the peaks' apexes, that is less than about 1 mil (0.025 mm) and, further, the adhesive-carrying surface of the thin film substrate having at least one adhesive-free zone running in a longitudinal direction on the plastic thin film substrate wherein the adhesive-free surface area constitutes at least about 10% to about 80% of the total surface area of the adhesive-carrying surface of the substrate.

BRIEF DESCRIPTION OF THE SEVERAL VIEWS OF THE DRAWING

The foregoing summary of the invention, as well as the following detailed description of preferred embodiments, will be better understood when read in conjunction with the appended drawings. For the purpose of illustrating the invention, there is shown in the drawings an embodiment which is presently preferred, it being understood, however, that the invention is not limited to the specific arrangements and instrumentalities disclosed. In the Drawings.

DETAILED DESCRIPTION OF THE INVENTION

The present invention is directed to the manufacture of an adhesive tape having an adhesive coating with a roughened surface texture that provides adhesive properties substantially equivalent to a conventionally coated adhesive tape, but with a significantly reduced amount of adhesive, e.g, preferably having only about one-half of the quantity of adhesive in a conventionally coated smooth surface adhesive tape.

Figure 1:
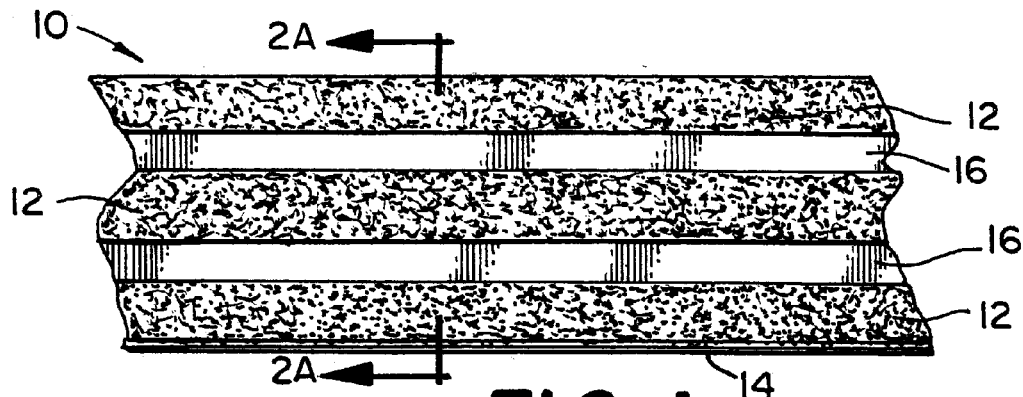
FIG. 1 is a perspective top view of the textured adhesive surface and adhesive-free zones of a preferred adhesive tape of this invention.

The present invention also includes adhesive tape with a roughened surface texture and regions that are adhesive-free, being in the form of adhesive-free zones or stripes that extend in the longitudinal direction of the tape. Such adhesive tape uses even less adhesive in its manufacture and is therefore particularly well suited for use as an economy grade of box sealing tape. Referring now to the drawings, FIG. 1 shows a perspective top view of such an adhesive tape, indicated generally as 10, having an adhesive coating 12 with a roughened surface texture that is carried on a substrate 14 and further preferably having two adhesive-free zones 16 extending in the longitudinal direction of the tape 10. The top surface of the substrate 14 on which the adhesive 12 is carried is visible in the adhesive-free zones 16.

Figure 2A:
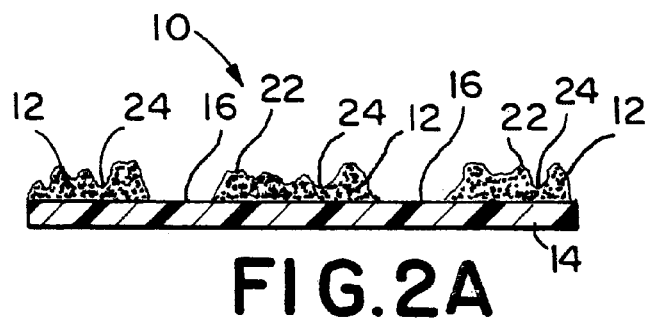
FIG. 2A is a schematic cross-section view, along line 2A–2A' in FIG. 1, of the textured tape, showing the polymeric substrate on which the peaks and valleys of the roughened textured surface of the adhesive layer adhered thereto are evident.

The adhesive tape 10 of this invention is characterized by having an adhesive coating 12 that may be described as having a roughened surface texture, with "peaks" 22 and "valleys" 24 in a random arrangement throughout the coating surface area, as shown schematically in FIG. 2A. The depth of the valleys 24 does not extend down to the top surface of the coated substrate 14 but generally averages about half of the height of the peaks 22, where the height of the peaks is measured in a perpendicular direction from substrate top surface carrying the coating up to the apexes of the peaks in the coating. The adhesive coating 12 on the adhesive tape substrate is continuous in its longitudinal and lateral dimensions, and the portion, i.e., bottom surface in the orientation of FIGS. 1 and 2A, of the adhesive coating 12 in direct contact with the adhesive tape substrate 14 provides a continuous coverage of adhesive 12 over the entire area of the substrate (except for the adhesive-free zones 16).

The exposed portion, i.e., exposed surface, of the adhesive coating 12 carried on the adhesive tape substrate 14 exhibits a roughened surface texture, with characteristic peaks 22 and valleys 24. The peaks 22 and valleys 24 are randomly located throughout the roughened texture surface. Thus, the peak-and-valley roughened structure of the adhesive coating 12 may be considered to be a "bulked-up" coating, without the addition of a non-adhesive bulking agent.

Figure 2B:
FIG. 2B is a schematic cross-section view of a prior art adhesive tape having adhesive properties similar to that of the textured adhesive tape of FIG. 2A but carrying about twice the amount of adhesive on the polymeric substrate.

Referring now to FIGS. 2A and 2B, it has been discovered that when the height of the peaks 22 in the textured adhesive coating 12 shown in FIG. 2A is approximately equivalent to the thickness of a conventional prior art smooth-coated adhesive coating 12PA shown schematically in FIG. 2B, the adhesive characteristics of such a roughened surface texture coating 12 (FIG. 2A) are comparable to those of a smooth-coated adhesive coating 12PA containing significantly more adhesive (FIG. 2B). For purposes of this disclosure, the "thickness" of the roughened texture surface of coating of this invention is defined as the peak height measured as just described This thickness measurement may be obtained using a micrometer, as is conventionally done with smooth-surfaced conventional adhesive coatings. The surprising discovery of this invention is that comparable adhesive properties exist even though the roughened surface texture coating of this invention contains substantially less, for example 75% or even only 50% or less, of the quantity of adhesive employed in a conventional smooth-coated adhesive coating having the same thickness, for example as shown in FIGS. 2A and 2B. In appearance to the naked eye, the roughened surface texture of the adhesive coating 12 of the present invention may have an uneven, bumpy, irregular or "orange peel" appearance, in contrast to the prior art smooth surface adhesive coating 12PA which has a smooth, even, reflective surface appearance to the naked eye (although on a magnified scale it is not absolutely smooth).

A presently preferred embodiment of adhesive tape of this invention includes an adhesive tape containing an adhesive coating that is equivalent in amount, e.g., weight per unit coated area, to a 0.35 mil (0.0089 mm) smooth adhesive coating but that exhibits the tackiness and adhesive properties comparable to a 0.7 mil (0.018 mm) smooth adhesive coating. Such adhesive tapes of this invention are particularly useful as economy grade box sealing tapes, e.g., for sealing cardboard cartons.

The roughened texture surface adhesive coating of this invention may be made using the same equipment line employed for making conventional smooth-coated adhesive tapes. It is important to note, however, that the roughened texture surface of the adhesive coating in this invention is a random pattern that is not an embossed or otherwise imprinted design, e.g., using a die or roller whose pattern is complementary to that of the adhesive coating surface or using a rotogravure engraving or intaglio technique. However, the roughened texture surface employed with the adhesive tape of this invention may be obtained in a surprising and unexpected manner that is nevertheless straightforward in its simplicity.

In the manufacture of conventional adhesive tapes, the coating of liquid adhesive is often treated with a smoothing bar, located downstream of the station where the adhesive coating is applied and metered with a metering rod (also called a Mayer rod) or doctor blade onto a continuous web. The smoothing bar is typically a smooth-surfaced, e.g., chrome-plated, cylindrical rod that serves to smooth the liquid (undried or uncured) adhesive coating on the moving, continuous web, removing minute striation marks, grooves or the like left by the coating metering rod (a Mayer rod or doctor rod) on the applied adhesive coating, prior to the adhesive coating being dried or cured.

In the present invention, it has surprisingly been discovered that the operation of a smoothing rod can be adjusted in a manner that produces the desired roughened surface texture on the applied adhesive coating instead of a conventional smooth surface on the coated adhesive, prior to its being cured or dried by heating. The method of this invention results in the adhesive coating being "bulked up" by the creation of a roughened surface texture with characteristic peaks and valleys, so a reduced quantity, e.g., about 50% or less to about 70% by weight, of adhesive is coated into the substrate, as compared with a conventional adhesive coating process.

In the present invention, the adhesive coating is first applied in a conventional manner to a continuous web that serves as the substrate for the adhesive tape. The adhesive is applied as a liquid, as is conventionally done in adhesive tape manufacture, and the liquid may be an adhesive solution, mixture, dispersion or emulsion, using an appropriate carrier or solvent, or it may be melted or molten adhesive. A preferred adhesive is an acrylic polymer resin, that is applied to the substrate as an aqueous emulsion. Such adhesives and their application as coatings to a substrate are well known to those skilled in the art, and further detailed discussion is therefore unnecessary for one to practice the present invention.

Figure 3:
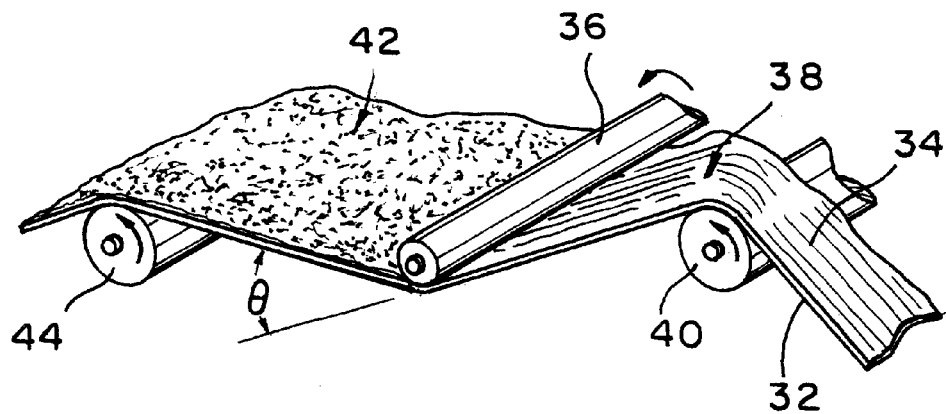
FIG. 3 is a perspective view of a portion of an adhesive tape coating apparatus, the portion shown including the rotating cylindrical roller that creates a roughened texture on the coated tape as it passes in contact with the rotating roller, the roller being rotated in a direction such that the contact region of the roller moves in a direction opposite to the direction of travel of the coated tape (see arrows) and being contacted with the moving coated tape at a slight wrap angle (θ).

Referring now to FIG. 3, the moving web substrate 32 with its applied adhesive coating 34, still in liquid form (i.e., prior to its being dried or cured), is then contacted, in the method of this invention, with a rotating cylindrical roller 36, the coated surface being brought into contact with the rotating roller 36. As is shown in FIG. 3, the coated web 38 passes over a free-wheeling idler roller 40 before being contacted with the motor-driven roller 36, and after being contacted with the roller 36, the coated web 42 passes over a second free-wheeling idler roller 44, and is thereafter directed to an adhesive drying or curing station (not shown). Instead of tangential contact between the applied adhesive coating 34 on the moving coated web 38 and the surface of the rotating roller 36, the coated side 32 of the web 38 is contacted with the rotating roller 36 at a slightly oblique "wrap angle," between about 2° to about 30°, preferably between about 5° to about 20°, and more preferably about 10°, measured as the angular difference between the plane of the approaching web 38 (prior to contact with the roller 36) and the plane of the departing web 42 (after being contacted with the rotating roller). This is shown in FIG. 3, where the wrap angle is indicated as "θ". By way of further explanation, a wrap angle of 90°, although outside of the range of wrap angles used in this invention, represents a right angle change in direction by the web as it passes over, i.e., partially around, a bar or roller.

Another factor important in the formation of the roughened surface texture of this invention is the rotation speed of the rotating roller 36, in particular, the linear speed of the roller surface at the point of contact between the roller 36 and coated web 38. It is critical that the roller 36 be rotated via a direct or indirect driving mechanism (not shown in FIG. 3) such as a motor, at a speed that is different from the linear speed of the moving web, i.e., the linear speed that would otherwise be obtained with a freely rotating roller in contact with the moving web. Preferably, the roller 36 is operated to rotate in a direction of travel (at the area of contact between the roller 36 and web 38) that is opposite to the direction of web travel. In FIG. 3, this is shown by the directional arrows for roller rotation and web travel. In such cases, the absolute value of linear speed of the roller 36 (at the area of contact with the web 38) is about 5 to about 100% of the absolute value of the web travel speed. By way of illustration, if the web 38 is moving at a speed of 200 ft/min (61.0 m/min), the roller 36 is preferably rotated at a rate that yields a linear speed rate at the outer surface of the roller that is from about 100 ft/min to about 200 ft/min (about 30.5 m/min to about 61.0 m/min), but preferably in a direction of travel opposite to that of the moving web.

It is possible, however, to obtain the desired roughened texture surface on the adhesive coating with a roller rotated in a direction that is in the same direction of travel (at the point of contact) as the moving web, provided that there is a significant difference, e.g., at least about 10% and preferably at least about 20%, between the two linear speed rates.

The roller 36 generally has a diameter of about 0.5 in. to about 2 in. (about 13 mm to about 51 mm), preferably about 0.75 in. to about 1.5 in. (about 19 mm to about 38 mm). The roller is preferably made of metal, e.g., stainless steel, but other materials, e.g., composites, plastics or hard elastomers are also suitable. The surface of the roller may be smooth, e.g., as with a conventional smoothing bar, or may be textured or roughened. In the latter situation, a coating of a antislip, antiskid material, either relatively smooth or with a pattern, e.g., dimples, can satisfactorily be used. One such dimpled antislip material is Tesa® tape (Beiersdorf AG, Hamburg, Germany) which is often used with rollers in coating equipment lines that process a moving web.

In the event a roller with a textured or roughened surface pattern is used, it should be understood that such patterns do not produce a complementary embossed or imprinted pattern on the surface of the adhesive coating, because there is a linear speed difference between the rotating roller and the moving web at the area of contact between the two.

The rotating roller 36 may be driven at the desired speed by conventional means, e.g., a drive motor operatively connected to the roller shaft either directly or with gear, chain and/or belt power transmission means. Motor speed may be conventionally adjusted, e.g., with a rheostat controller for electric motors.

After the textured surface pattern is created on the still-liquid adhesive coating in the method of this invention, the adhesive coated web 42 is subjected to conditions that effect drying or curing of the adhesive (not shown in FIG. 3).

For hot melt adhesive systems, the thickness of the dried or solidified adhesive coating will be substantially similar to that of the still-liquid or molten adhesive after the textured surface pattern is created. With solvent-based adhesives or other adhesive systems using a carrier that is volatilized or evaporated, the thickness of the dried adhesive coating will be less, usually substantially less, than the still-liquid coating after the texturized surface pattern has been created.

For example, application of a preferred adhesive system that is an aqueous emulsion of an acrylic polymer resin, containing, e.g., 50% solids, will result in a still-liquid roughened coating that has a thickness that is about twice that of the dried adhesive coating with the roughened texture surface. During the drying process, the water content of the applied coating of acrylic resin emulsion is driven off, resulting in a dry adhesive coating that is substantially thinner that the applied coating of liquid adhesive emulsion but that still retains the roughened texture surface coating according to this invention. It has been discovered that drying or curing of the liquid adhesive coating having the roughened texture surface, when such drying or curing is carried out in a manner conventionally used with smooth adhesive coatings, nevertheless still provides a dry adhesive coating on the web substrate that has the desired roughened texture surface with peaks and valleys.

The adhesive coatings made by the method of this invention provide adhesion characteristics that are comparable to smooth-coated adhesive coatings that require a much larger quantity of adhesive (per unit area of tape). However, a given thickness, e.g., 1 mil (0.025 mm) of adhesive coating according to this invention requires only about 50–70% of the amount of adhesive required to provide comparable smooth adhesive coating of equivalent thickness, e.g., 1 mil, made by prior art methods.

This invention is particularly well suited for pressure-sensitive adhesive systems conventionally used to make box sealing tape. Such adhesive systems include pressure-sensitive thermoplastic synthetic resin adhesives of which acrylic and methacrylic acid ester resins are preferred. Robond® and Rhoplex® (Rohm & Haas Co.) and UCAR® (Union Carbide Corporation) are brand names for such commercially available acrylic resin adhesives, and Robond® PS-83 acrylic emulsion is one suitable aqueous acrylic polymer resin emulsion. Other such adhesive systems include natural and synthetic rubber adhesives, including solvent rubber and hot melt rubber adhesive systems.

For economy grade sealing tapes, the dry adhesive coating (after drying or curing) is preferably less than about 1 mil (0.025 mm) in thickness, where thickness is measured from the web substrate surface carrying the adhesive to the adhesive peaks' apexes. More preferably, the adhesive coating thickness is less than about 0.8 mil (0.020 mm). Such a coating thickness of less than about 1 mil requires an amount of adhesive that is significantly less than the minimum amount of adhesive required to provide a 0.7 mil (0.018 mm) smooth adhesive coating, the minimum effective adhesive coating presently used with conventional acrylic resin-based sealing tapes. The preferred adhesive system for such economy grade sealing tapes is a pressure-sensitive acrylic polymer resin.

The economy grade sealing tapes of this invention provide a significant benefit in their economical usage of adhesive while still providing the requisite box sealing adhesion characteristics for use of such tapes.

The web substrate may be any continuous substrate material that is conventionally used for adhesive tapes, particularly pressure-sensitive adhesive sealing tapes. Polypropylene film is highly preferred. Other plastic film materials are also suitable, e.g., polyester, polyvinylchloride (PVC), and the like. The substrate film preferably has a thickness of less than about 1.5 mils (0.038 mm). A polypropylene film with a thickness of about 1.2 mils (0.030 mm) is preferred as the substrate for economy grade sealing tapes.

Another aspect of the present invention that provides additional economical usage of adhesive for the roughened texture adhesive tape of this invention is the presence of one or more adhesive-free zones on the tape substrate. The adhesive-free zones are in the form of adhesive-free stripes, or strips, that extend or are oriented in a longitudinal direction of the tape and are located between the lateral edges of the tape. In other words, the adhesive-free zones run in the same direction as the direction of web travel during manufacture of the box sealing tape.

The box sealing tape, after being wound on a reel (e.g., a cardboard tube) and being slit to the desired width, may contain one or more adhesive-free zones, i.e., stripes. The stripes are preferably situated so as to provide adhesive-containing areas on the finished, wound tape that extend to the lateral edges of the finished tape. The adhesive-free zones preferably account for at least about 10% to about 80%, more preferably about 15% to about 70%, and most preferably about 20% to about 60%, of the total area of the surface (side) of the tape that is coated with adhesive (i.e., not counting the uncoated side of the tape substrate that carries no coating on any of its surface). The finished tape preferably contains from 1 to about 5 adhesive-free zones in the form of stripes, with 1 to 3 being more preferred.

The absence of adhesive in these adhesive-free zones has been found to provide a preferred economy grade sealing tape that nevertheless provides acceptable box sealing characteristics when used in box sealing applications. Such tapes are noteworthy for the small amount of adhesive used during their manufacture. First, the amount of adhesive used (per unit adhesive-coated area) is substantially less than in conventional, smooth-coated adhesive tapes, because of the roughened texture surface of the adhesive. Secondly, the adhesive-free zones provide a further reduction in the amount of adhesive required, about 10% to about 80% less, depending on the percentage of adhesive-free area relative to the total surface area of the coated side of the tape. Such adhesive-free zones may be made by use of wipers in the tape coating apparatus, the wipers serving to remove a zone of adhesive on the coating applicator roller used to apply the liquid adhesive to the web substrate, prior to the applied liquid adhesive being metered to a specific coating thickness with a conventional metering rod, also called a doctor bar or Mayer bar. A preferred method of providing such adhesive-free zones is described in copending U.S. patent application Ser. No. 08/800,369 of Speeney for "Method of Making an Adhesive Tape with Adhesive-free Zones and Adhesive Tape So Made", filed on the same date as the present application, whose disclosures about the manufacture of sealing tapes with adhesive-free zones are hereby incorporated herein by reference.

The present invention is illustrated further by the following non-limiting Example.

EXAMPLE

The present Examples describes the use of a conventional smoothing bar to produce an adhesive tape whose adhesive surface after being dried has a roughened texture, similar in appearance to an "orange peel" surface texture. In a continuous adhesive coating system, a continuous web of polypropylene film is used as the tape substrate and is coated with an acrylic polymer resin adhesive. The liquid adhesive used to coat the substrate is an aqueous emulsion of an acrylic polymer resin containing about 50% solids, and this liquid adhesive is coated onto the substrate at a rate of about 500–600 ft/min. with a coating metering rod, i.e., a Mayer rod, selected and adjusted to provide about a 1.4 mil (0.0014 in) thick liquid coating of the 50% aqueous coating emulsion. Tension on the moving web is maintained at about 2 lb/linear in. (about 3.5 newtons/linear cm).

The liquid adhesive coated web, after passing over an idler roller, is contacted on its adhesive-coated surface with a smoothing bar at a slightly oblique wrap angle, as described below, with tension maintained on the web to produce the "orange peel" textured surface pattern. The tension or pressure of the adhesive coated web against the smoothing bar is provided by the unwinder brake. A suitable smoothing bar is a ¾ in. (19 mm) diameter cylindrical chrome smoothing rod (often called a smoothing bar) having a smooth surface and rotated at 50 rpm in a direction (at the area of contact between the rotating bar and the moving coated web) that is opposite to the direction of travel of the web. Alternatively and more preferably, the smooth-surfaced smoothing bar has its outer surface covered with an antiskid material, e.g., being wrapped with a uniform layer of Tesa® dimpled antislip, antiskid tape. The appropriate "orange peel" textured surface effect is obtained when the wrap angle on the chrome smoothing bar is slightly oblique, at about 10°. The wrap angle, as described above, refers to the angular change in direction of the web as it exits from the bar.

The amount of liquid adhesive coating applied to the tape substrate is about 1.4 mil (0.036 mm), and after drying of the textured surface liquid adhesive coating, the resulting dry adhesive on the finished tape has a roughened texture that is about 0.7 mil (0.018 mm) in thickness, measured at peak height. This amount of adhesive coating applied, if smooth-coated by conventional techniques using the smoothing bar set to obtain a smooth surface, is the same amount as would yield a 0.35 mil (0.0089 mm) thick smooth-coated adhesive coating after drying, but such a 0.35 mil (0.0089 mm) thick smooth-coated adhesive coating normally exhibits unacceptable adhesive properties, i.e., such tape does not exhibit satisfactory tack properties and box sealing performance. The adhesive tape made according to this Example, however, exhibits satisfactory box sealing performance characteristics.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined by the appended claims.

What is claimed is:

1. An economy sealing tape comprising a continuous length of a smooth surfaced plastic thin film substrate having one side carrying a thin dry coating of a pressure-sensitive adhesive, the adhesive coating having on an outer surface, opposite from the one side of the plastic thin film substrate, a nonembossed, roughened surface texture with a plurality of peaks and valleys, each of the peaks having an apex, the adhesive coating having a coating thickness, measured perpendicularly from the one side of the plastic thin film substrate to the peaks' apexes, that is less than about 1 mil (0.025 mm), the one side of the plastic thin film substrate having at least one adhesive-free zone running in a longitudinal direction on the plastic thin film substrate wherein the at least one adhesive-free zone has a surface area of at least about 10% to about 80% of the total surface area of the one side of the plastic thin film substrate.

2. The tape of claim 1 wherein the plastic thin film substrate is selected from the group consisting of polypropylene, polyester and polyvinylchloride.

3. The tape of claim 1 wherein the plastic thin film substrate is less than about 1.5 mil (0.038 mm) in thickness.

4. The tape of claim 1 wherein the adhesive is a pressure-sensitive acrylic polymer resin.

5. The tape of claim 1 wherein the adhesive-free surface area constitutes about 30% to about 60% of the total surface area.

6. The tape of claim 1 wherein the weight of adhesive coating per unit area is not more than about 70% of the weight of the same adhesive if applied as a smooth-surfaced adhesive coating having the same coating thickness.

7. The tape of claim 6 wherein the weight of adhesive coating is not more than about 50% of the weight of the same adhesive if applied as a smooth-surfaced adhesive coating having the same coating thickness.

* * * * *